United States Patent [19]
Frankot

[11] Patent Number: 5,463,397
[45] Date of Patent: Oct. 31, 1995

[54] HYPER-PRECISION SAR INTERFEROMETRY USING A DUAL-ANTENNA MULTI-PASS SAR SYSTEM

[75] Inventor: Robert T. Frankot, Van Nuys, Calif.

[73] Assignee: Hughes Aircraft Company, Los Angeles, Calif.

[21] Appl. No.: 140,946

[22] Filed: Oct. 25, 1993

[51] Int. Cl.⁶ .................................................. G01S 13/90
[52] U.S. Cl. ........................... 342/25; 342/194; 342/195
[58] Field of Search ............................. 342/25, 194, 195, 342/174

[56] References Cited

U.S. PATENT DOCUMENTS

| | | | |
|---|---|---|---|
| 4,723,124 | 2/1988 | Boles | 342/25 |
| 4,967,200 | 10/1990 | Arambepola | 342/25 |
| 4,975,704 | 12/1990 | Gabriel et al. | 342/25 |
| 4,985,704 | 1/1991 | Smith | 342/25 |
| 5,043,734 | 8/1991 | Niho | 342/25 |
| 5,170,171 | 12/1992 | Brown | 342/191 |
| 5,189,424 | 2/1993 | Brown | 342/25 |
| 5,248,976 | 9/1993 | Niho et al. | 342/25 |
| 5,250,952 | 10/1993 | Roth | 342/25 |
| 5,260,708 | 11/1993 | Auterman | 342/25 |
| 5,307,070 | 4/1994 | Runge et al. | 342/25 |
| 5,343,203 | 8/1994 | Chen | 342/25 |

*Primary Examiner*—John B. Sotomayor
*Attorney, Agent, or Firm*—Leonard A. Alkov; W. K. Denson-Low

[57] ABSTRACT

The present invention is an interferometric SAR system and processing method that combines multi-pass SAR interferometry with dual-antenna SAR interferometry to obtain elevation maps with accuracy unobtainable by either method alone. A single pass of the dual-antenna system provides coarse elevation maps. High accuracy maps are obtained through additional passes, with accuracy determined by the number of passes. The processing method combines the acquired data to provide a calibrated, high precision, low ambiguity elevation map, using approximate least-squares and maximum-likelihood processing methods. The present dual-antenna SAR interferometer collects two complex SAR images from slightly different elevation angles on a single pass using two antennas on the same platform. The present invention provides calibrated maps that have coarse precision but are nearly unambiguous because of the small interferometer baseline. The multi-pass method collects two or more complex images using multiple passes of a radar platform with each antenna. Alone, the multipass method provides much more precise, but ambiguous and uncalibrated, elevation maps. However, the present invention combines the dual-antenna and multi-pass techniques to provide unambiguous and highly precise maps.

10 Claims, 7 Drawing Sheets

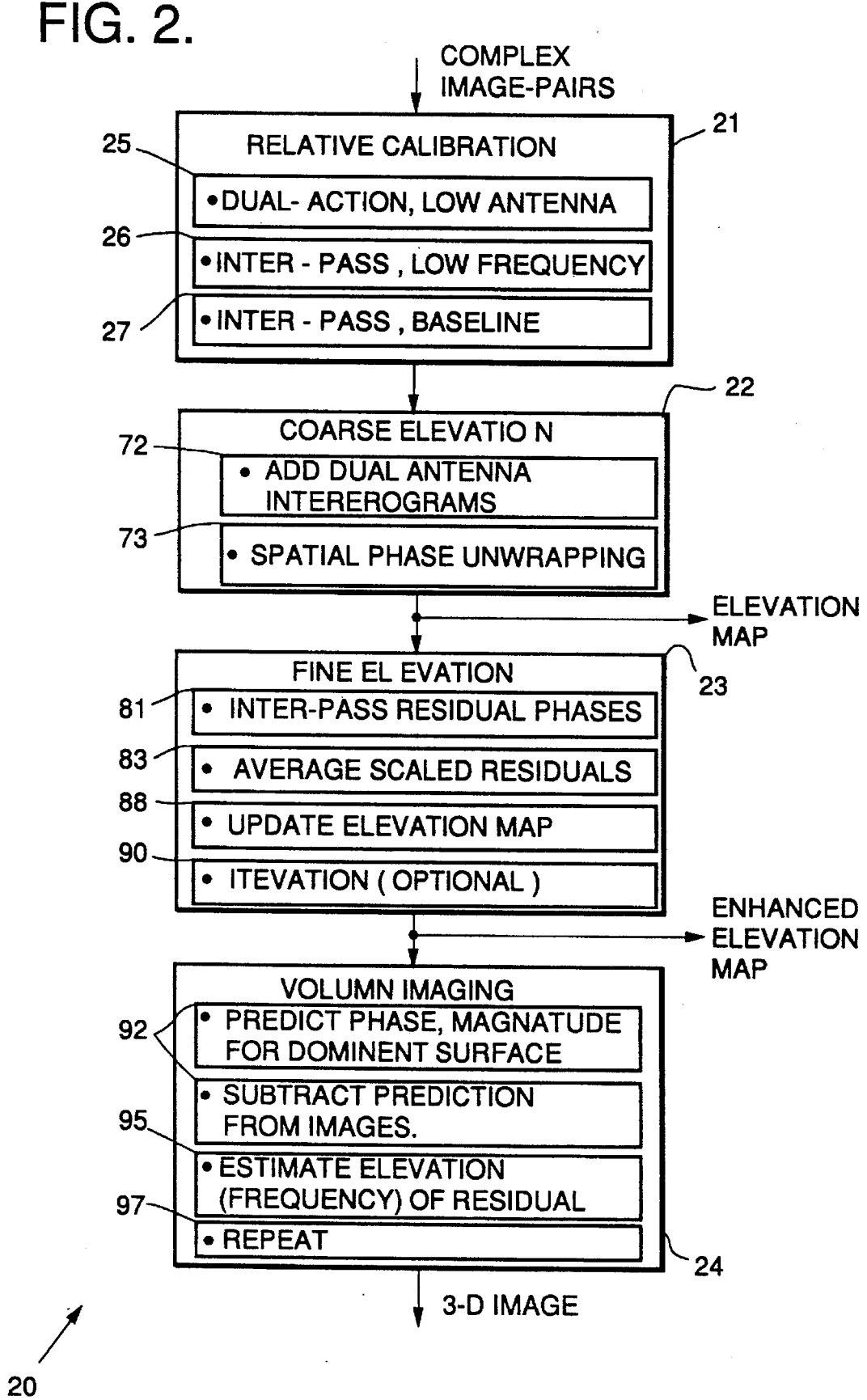

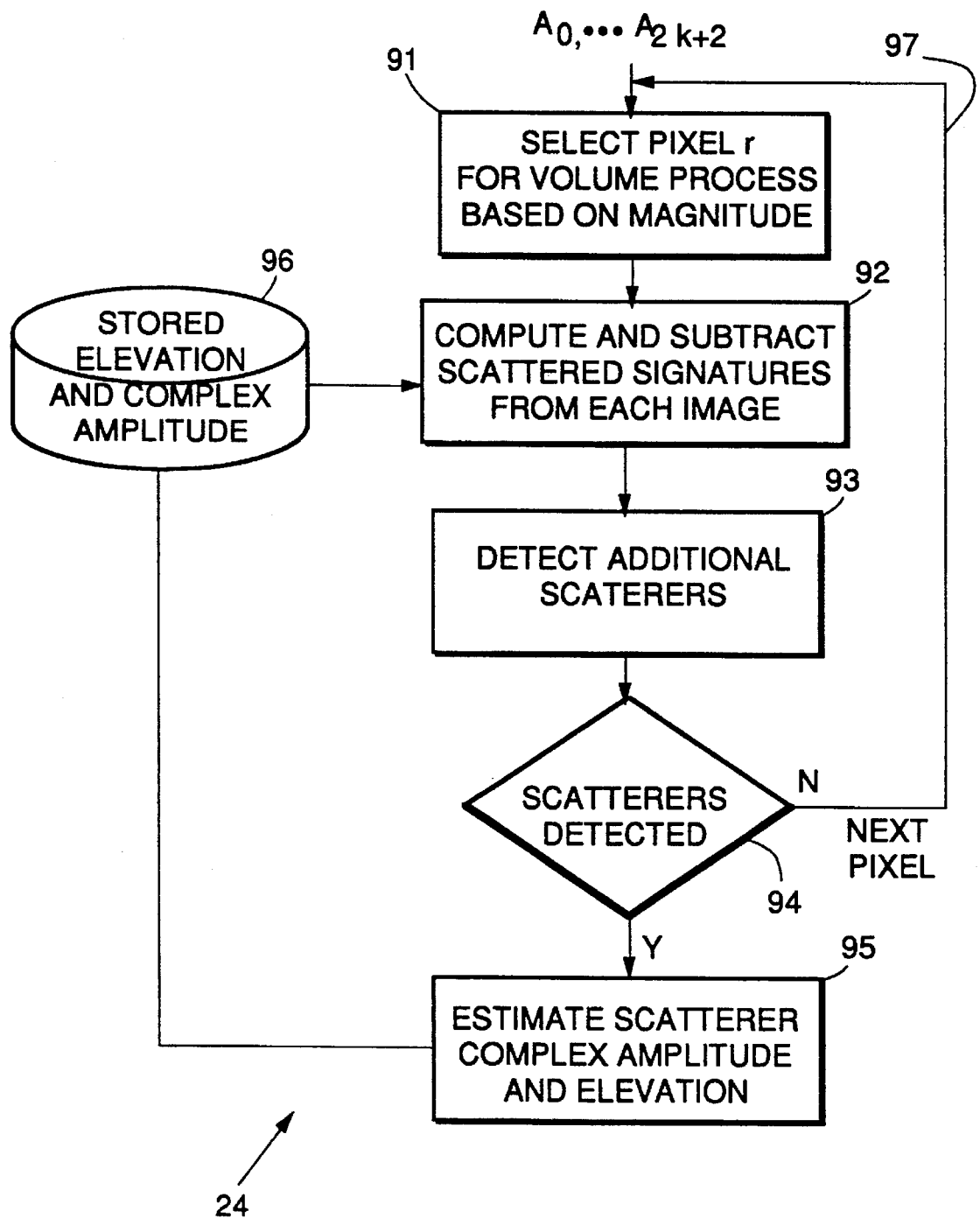

HYPER-PRECISION SAR INTERFEROMETRY USING A DUAL-ANTENNA MULTI-PASS SAR SYSTEM

BACKGROUND

The present invention relates to SAR interferometry, and more particularly, to hyper-precision SAR interferometry using a dual-antenna multi-pass SAR system and processing method.

Previous SAR interferometers were either dual antenna systems, such as are described in L. C. Graham, "Synthetic Interferometer Radar for Topographic Mapping", Proc. IEEE, Vol. 64, pp. 763–768, June 1974, achieving limited relative accuracy, or were derived from post processing of data from pass-to-pass, as is described by F. Li and R. Goldstein, "Studies of Multi-baseline Spaceborne Interferometric Synthetic Aperture Radars", *IEEE Trans. Geocsience and Remote Sensing*, Vol. 28, pp. 88–97, January 1990, achieving limited absolute accuracy due to phase ambiguities and lack of relative calibration.

The synthesis of dual-antenna and multi-pass interferometry is technically difficult because of problems in effectively combining the two types of data. A process of simply averaging data from different passes is not effective because the phase functions have imprecisely known differences in scale (interferometer baseline), they have unknown systematic error terms (at least affine in range-azimuth), they include possibly severe random noise, and, after all of these degradations, are only measurable modulo $2\pi$. This also precludes the superficial application of traditional ambiguity resolution techniques, for example the independent application of the Chinese Remainder Theorem in each range-azimuth cell. Selecting the phase difference basically from one image pair or another, as a function of phase variance, also fails for the same reasons.

SUMMARY OF THE INVENTION

The present invention is an interferometric SAR system and processing method that combines multi-pass SAR interferometry with dual-antenna SAR interferometry to obtain elevation maps with accuracy unobtainable by either method alone. A single pass of the dual-antenna system provides coarse elevation maps. High accuracy maps are obtained through additional passes, with accuracy determined by the number of passes. The processing method employed in the interferometric SAR system combines the acquired data to provide a calibrated, high precision, low ambiguity elevation map, using approximate least-squares and maximum-likelihood processing methods.

The traditional dual-antenna SAR interferometer (used as a component of the present invention) collects two complex SAR images from slightly different elevation angles on each pass using two antennas on the same platform, providing calibrated maps that have coarse precision but are nearly unambiguous because of the small interferometer baseline. The multi-pass method collects two or more complex images using multiple passes of a radar platform with a single antenna. Alone, the multi-pass method provides much more precise, but ambiguous and uncalibrated, elevation maps. The present invention combines the dual-antenna and multi-pass techniques to provide unambiguous and highly precise maps.

The present system and method achieves better accuracy and flexibility than conventional approaches. The present system and method combines these two techniques to achieve much better accuracy, and may provide accuracy and resolution typically associated with low altitude optical stereo mapping systems together with the all-weather, day-night mapping capability of radar.

The dual-antenna interferometer of the present invention provides the basis for a least-squares fit to locally affine phase errors resulting from relative-position uncertainties in the multiple flight paths and thus improves relative calibration. The dual-antenna interferometer resolves severe phase ambiguities of the inter-pass interferometer independently at each pixel, and thus handles terrain discontinuities, man-made structures.

Spatial phase unwrapping resolves moderate ambiguities if they are not completely resolvable by the dual-antenna interferometer which yields high accuracy in areas of low-to-moderate relief. The elevation separation between multiple passes increases geometrically which improves the accuracy for a fixed data collection cost. The elevation map is refined iteratively which reduces the impact of calibration errors and outliers. The phase estimation process is boot-strapped from small-separation to large separation image-pairs which reduces computation. The calibrated complex image-pairs are processed to create 3-D (volume) images, which helps resolve layover and detect concealed objects.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates a processing method employed in the system of FIG. 1;

FIG. 7 details the volume imaging processing step of the method of FIG. 2.

DETAILED DESCRIPTION

Figure 1:
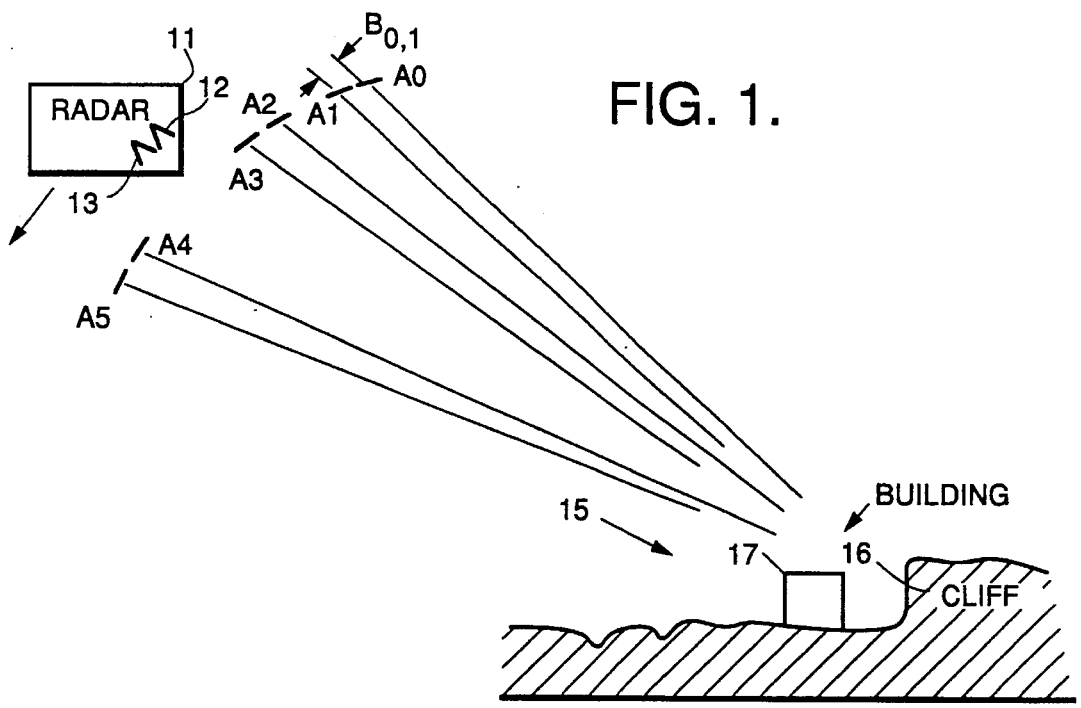
FIG. 1 shows an operational scenario using a hyper-precision interferometer system and method in accordance with the principles of the present invention.

Referring to the drawing figures, FIG. 1 shows an operational scenario using a hyper-precision interferometer system 10 and method 20 in accordance with the principles of the present invention. The hyper-precision interferometer system 10 comprises a dual-antenna interferometric SAR system 11. The dual-antenna interferometric SAR system 11 is comprised of a SAR radar having two antennas 12, 13 spaced apart by a predetermined fixed distance, $B_{0,1}$. The two antennas 12, 13 are used to take successive SAR maps of an image scene 15 identified as images $A_1$ and $A_2$, $A_3$ and $A_4$, and $A_5$ and $A_6$, respectively, pass 1: $A_0$, $A_1$; pass 2: $A_2$, $A_3$; ... pass k: $A_{2k-2}$, $A_{2k-1}$. The image scene 15 includes a cliff 16 and a building 17, for example.

Coarse-precision SAR maps are generated by each pass of the dual-antenna interferometric SAR system 11 by the image scene 15. Multiple passes of the system 10 by the image scene 15 greatly extends the precision of the SAR maps using the processing method 20 of the present invention.

The dual-antenna system 10 and method 20 provides for calibration and ambiguity resolution not feasible with multiple passes of a single-antenna system. Let $A_{2k}$ and $A_{2k+1}$ denote complex SAR image pairs derived from two antennas 12, 13 on the kth pass by the image scene 15, where k=0, . . . , K–1.

A measurement model employed in the method 20 and system 10 of FIG. 1 will now be described. Complex images $A_m(r_m)$ are measured in SAR slant plane coordinates $r_m$ of the SAR radar 11 obtained from different elevation angles. These correspond to the different elevation angles of the two antennas 12, 13, respectively. An elevation map z(x) in ground coordinates x and a volume image A(x,z) are estimated from the complex images. To obtain the elevation map, an intermediate variable, the phase difference between the images, is estimated.

The following model is assumed for complex image-pair product, or interferogram;

$$A_m = a(r) \exp[j\phi_m(r)] + n_m(r) \quad (1)$$

where $n_m$ is a complex additive noise field. The phase function $\phi_m$ contains the following components; locally affine systematic phase error that may be different for each m, a reference phase term that is random in r but constant in m, a phase noise term that is random in both r and m, and phase signal term that is a locally-linear function of elevation z.

The model for the complex image-pair product (interferogram) is therefore $$A_m A_n^* = |\bar{a}(r)|^2 \exp\{j\phi_{m,n}r\} + n_{m,n}, \quad (1a)$$

where $n_{m,n}$ is additive noise which may depend on a. The model for the phase difference in terms of the elevation map is given by $$\phi_{m,n}(\underline{x}) \approx \left( \frac{c_{m,n}\pi}{\lambda} \right) \left( \frac{B_{m,n}\cos\theta}{r_0} \right) z(\underline{x})_- + \beta_{m,n}(\underline{x}) \quad (2)$$

where $\lambda$ is the radar wavelength, $B_{m,n}$ is the elevation separation between the mth and nth image either in units of distance, referred to loosely as the baseline, $\theta$ is the depression angle, $r_0$ is the slant range of a central reference point, and $\beta_{m,n}$ is a locally-affine (linear plus constant) phase difference arising from range, angle, doppler, and other offsets in imaging conditions. The constant $c_{m,n}$ is defined to compensate for the difference between two-way propagation of the single-antenna interferograms and the one-way propagation of the dual-antenna interferogram, so that $$c_{m,n} = \begin{cases} 2 & (m,n) = (2k, 2k+1) \\ 4 & \text{otherwise} \end{cases} \quad (3)$$

It is assumed (but is not a fundamental requirement) that the same dual-antenna separation is achieved on each pass, so that $$B_{2k,2k+1} = B_{0,1} \quad (4)$$

for k=0, . . . , K–1. Other separations $B_{m,n}$ may be arbitrary.

An elevation-dependent correction in coordinates $r_n$ are made to maximize accuracy, making it conform more closely to $r_m$. This is an elevation map estimation process that is described below. The synthesis of the multi-pass and dual-antenna interferometry techniques is technically difficult due to the difficulty in effectively combining the two types of data. A process of simply averaging data from different passes is not effective because the phase functions have imprecisely known differences in scale (interferometer baseline), they have unknown systematic error terms (at least affine in range-azimuth), they include possibly severe random noise and, in addition to all of these degradations, are ambiguous in $2\pi$ intervals. This also precludes the superficial application of traditional ambiguity resolution techniques, for example the independent application of the Chinese Remainder Theorem in each range-azimuth cell. Selecting the phase difference locally from one image pair or another, as a function of phase variance, also fails for the same reasons. The present processing method 20 overcomes these difficulties.

FIG. 2 shows the specifics of the processing method 20 employed in the system of FIG. 1. The processing method 20 processes the complex image-pairs derived from the dual-antenna interferometer 10. The processing method 20 comprises four main processing steps including a relative calibration processing step 21, a coarse elevation processing step 22, a fine elevation processing step 23, and a volume imaging step 24.

The relative calibration processing step 21 includes dual-antenna, low frequency phase error processing (step 25, shown in detail in FIG. 3a) to remove low frequency phase inconsistencies between dual-channel (same-pass) image pairs, inter-pass, low frequency processing (step 26, shown in detail in FIG. 3b) to remove low frequency phase inconsistencies between inter-pass image pairs, and inter-pass baseline processing (step 27, shown in detail in FIG. 3b) to estimate the elevation angle separation between each pass.

The coarse elevation step 22 includes noise processing (step 72) that adds data from the dual-antenna interferometer to reduce the effects of noise, and spatial phase unwrapping (step 73) to resolve minor ambiguities in the coarse elevation estimate. The output of the coarse elevation step 22 provides an elevation map. A detailed discussion of the coarse elevation step 22 is provided below with reference to FIG. 4.

The fine elevation step 23 includes inter-pass residual phase processing (steps 81, 82) to compute the phase update attributable to each pass of the interferometer, average scaled residual processing (step 83) to combine these multiple phase updates with the proper relative scaling (step 89) into a single accurate elevation update, update processing (step 88) to update the elevation map provided by the coarse elevation step 22, and optional iteration processing (loop 90) of the updated elevation map to provide greater accuracy under adverse conditions. The output of the fine elevation step 23 provides an enhanced elevation map. The details of the fine elevation step 23 are provided with reference to FIG. 5.

The volume imaging step 24 comprises prediction processing (step 92) to predict the phase and magnitude of the dominant surface in the image scene 15, subtraction processing (step 92) to subtract the predicted data from actual image data, and residual estimation processing (step 95) to estimate the elevation (frequency) of residual data. These processing steps are repeated (loop 97) for each pass of the system 10 across the in,age scene. The output of the volume imaging step 24 is a three dimensional SAR image. The details of the volume imaging step 24 are provided with reference to FIG. 7.

Figure 3A:
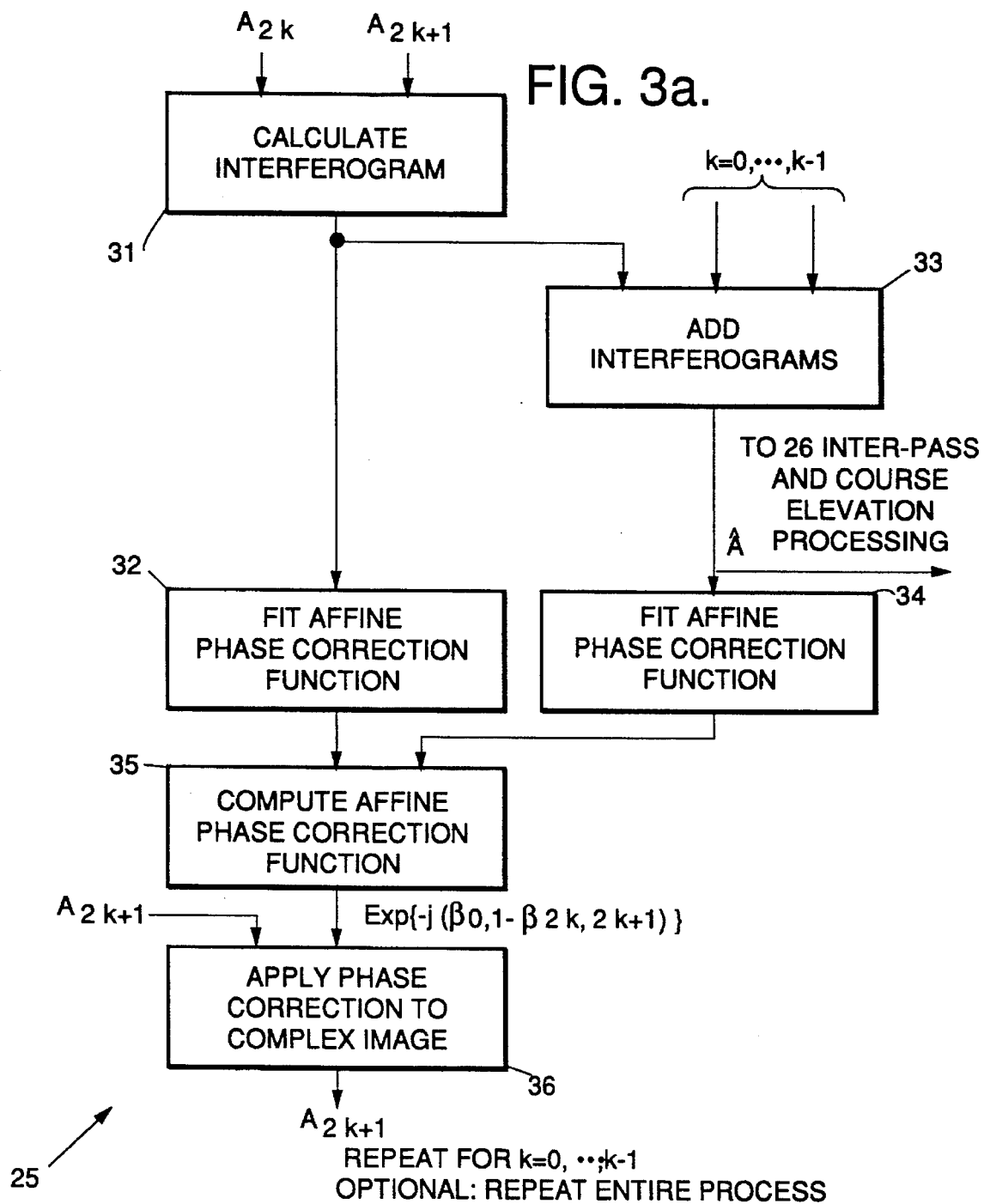
FIGS. 3a and 3b detail the relative calibration processing step of the method of FIG. 2.
Figure 3B:
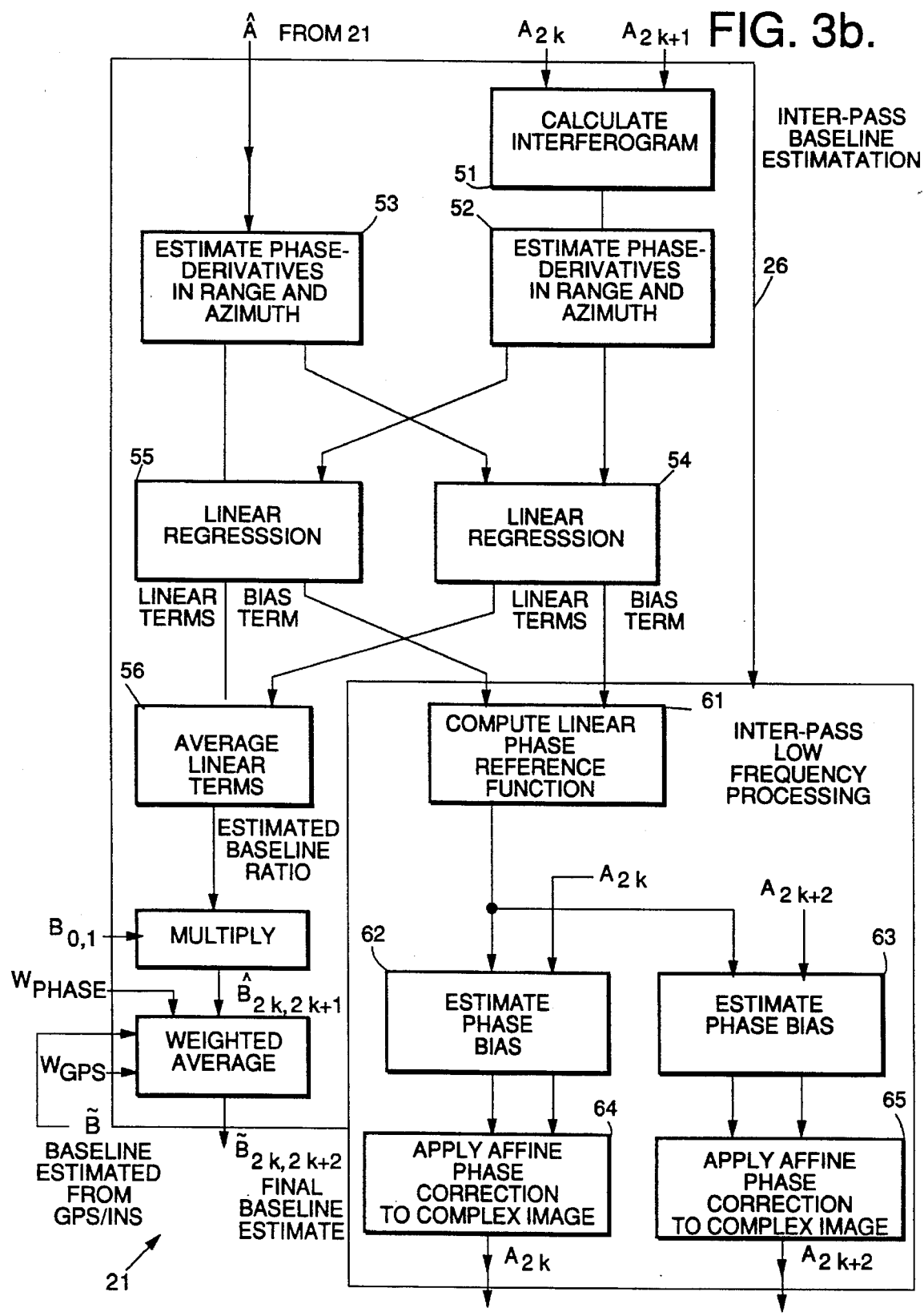

Details regarding the above four major processing steps 21–24 will be described with reference to FIGS. 3–7. With reference to FIGS. 3a and 3b, they detail the relative calibration processing step 21 of the method 20 of FIG. 2. The relative calibration processing step 21 comprises dual-antenna low-frequency processing 25 which comprises calculating the interferogram from the complex SAR image pairs, $A_{2k}$, $A_{2k+1}$, as indicated in step 31. In step 32, the affine phase coefficients are calculated from the interferogram of step 31 using phase fitting techniques such as are used in conventional SAR autofocus routines. Interferograms calculated in step 31 are added for k=0 to k=K–1, as indicated in step 33. In step 34, the affine phase coefficients are calculated from the interferogram of step 33 using the same procedures employed in step 32. An affine phase correction function is then computed, as indicated in step 35. The phase correction function is then applied to the complex image, as indicated in step 36. Steps 31, 32, 35 and 36 are repeated for k=0, . . . K–1. Optionally, if the affine phase coefficients differ significantly for different values of k, the entire set of process steps 31–36 are repeated.

The inter-pass, low frequency processing (step 27) and inter-pass baseline processing (step 26) are detailed in FIG. 3b. The inter-pass, baseline estimation (step 26) comprises calculating the interferogram (step 51), estimation of the phase derivatives in range and azimuth for the complex SAR image pairs, $A_{2k}$, $A_{2k+1}$, as indicated in step 52, and for the sum of dual-antenna interferograms, Â, as indicated in step 53. A linear regression procedure is then performed on each set of phase derivatives from the estimation steps 52, 53, as indicated in steps 54, 55. The linear terms from each respective linear regression step 54, 55 are averaged, as indicated in step 56. This produces an estimated baseline ratio. The estimated baseline ratio is multiplied by the dual-antenna baseline($B_{0,1}$) as indicated in step 57. Finally the multiplied baseline ratio($\hat{B}_{2k,2k+1}$), the weight ($W_{phase}$), baseline estimates from the GPS/INS, and the baseline estimate from the GPS/INS, and the weight ($W_{GPS}$) are combined to produce a weighted average, which results in a final baseline estimate $\tilde{B}_{2k,2k+2}$, as indicated in step 58. The inter-pass, low frequency processing step 26 is repeated for k=0, . . . , K–2.

The inter-pass low frequency processing (step 27) processes the bias terms from each of the linear regression steps 54, 55 by computing a linear phase reference function in step 61, and then computing phase bias estimates (steps 62, 63) for each of the complex SAR image pairs, $A_{2k}$, $A_{2k+2}$. The phase bias estimates from steps 62, 63 are processed to apply affine phase correction thereto, as indicated in steps 64, 65. The phase-corrected complex SAR images, $A_0$. . . $A_{2k+1}$ are processed by the remainder of the process steps 22, 23, 24 of the present method 20.

Absolute position is calibrated using the global positioning system (GPS) and/or external ground-control points. This is common to all mapping systems and is not discussed in detail herein. However, a number of relative calibration problems do arise, for which the present invention provides innovative solutions that are described below.

The dual-antenna low-frequency phase error processing will now be described in more detail. For the dual-antenna image-pairs, $A_{2k}$, $A_{2k+2}$, the baseline $B_{2k,2k+1}$ is known precisely and any locally affine phase difference $\beta_{2k,2k+1}$ is precisely attributable to trends in object elevation. It may be possible, however, for small errors to appear in the affine term because of motion errors in the two antennas that do not exactly cancel. Estimating and compensation for this effect in processing dual antenna image-pairs, $A_{2k}$, $A_{2k+2}$, is important because subsequent calibration (step 27) and elevation estimation procedures (steps 22, 23) depend on it.

The locally-affine phase function $\hat{\beta}_{0,1}$ is fit (steps 32, 33) to the sum $$\hat{A}() = \sum_{k=0}^{2K-1} A_{2k}(r) A^{*}_{2k+1}(r) \qquad (5)$$

Conventional approaches to this fitting process may be employed such as conventional SAR autofocus and Fourier transform-based image registration techniques.

The phase of each dual-antenna conjugate product image $A_{2k}A_{2k+1}^{*}$ is normalized (step 35) so that it produces that same fitted phase component (step 36). This may be accomplished by estimating $\hat{\beta}_{2k,2k+1}$ using the same method used in estimating $\hat{\beta}_{0,1}$, and then performing the multiplication $$A_{2k+1}^{*}(r) \leftarrow A_{2k+1}^{*}(r) \exp\{j(\hat{\beta}_{0,1} - \hat{\beta}_{2k,2k+1})\}. \qquad (6)$$

Relative phase calibration for each conjugate-product image (interferogram) is performed before fusing multi-pass interferometric data. The process of applying equations (5) and (6) and the intervening fit of $\hat{\beta}_{0,1}$ may be repeated if the difference $\hat{\beta}_{0,1} - \hat{\beta}_{2k,2k+1}$ is large.

Inter-pass baseline processing (step=s 51–58) will now be discussed in more detail. The baseline separation indicated by GPS data, denoted $B_{m,n}$, is not exact and its error may be significant. This type of error causes a scale factor uncertainty in z. With multiple passes and dual-antenna data available for each pass, the GPS estimates of $B_{m,n}$ are refined by performing a weighted-least-squares (WLS) adjustment. The dual-antenna baseline $B_{0,1}$ is assumed to be equal for each pass. An estimated baseline $\hat{\beta}_{2k,2k+2}$ between each pass is obtained by a least-squares fit between the phase of Â and $A_{2k}A_{2k+2}^{*}$. First the phase derivatives of A and $A_{2k}A_{2k+2}$ are calculated in range and azimuth. This results in two real valued phase derivative images (one for range, the other for azimuth) for each interferogram. Then a linear regression is performed between the phase derivative images derived from A and those derived from each $A_{2k}A_{2k+2}$. Each regression performs a least-squares fit between two phase derivative images (treating each pixel independently) resulting in a bias term and a slope term. (The slope term in range and azimuth should be identical except for noise so the two are average before further processing takes place.) This slope term is an estimate of the baseline ratio and is multiplied by $B_{01}$ to get $B_{2k}B_{2k+2}$. The following WLS estimate is then obtained $$\tilde{B}_{2k,2k+2} = (W_{GPS}B_{2k,2k+2} + W_{phase}\hat{B}_{2k,2k+2})/(W_{GPS} + W_{phase}) \qquad (7)$$

where $W_{GPS}$ is inversely proportional to the variance of $\hat{B}_{2k,2k+2}$ and $W_{phase}$ is inversely proportional to the variance of $\hat{B}_{2k,2k+1}$. Reasonable estimates of these variances are typically available.

Inter-pass, low-frequency phase error processing (steps 61–65) removes phase inconsistencies and will now be discussed in more detail. For the inter-pass image-pairs, the locally-affine phase difference $\beta_{m,n}$ has a significant random component that is indistinguishable from object elevation trends. With this type of error, elevation is only determined relative to some unknown reference plane. However, the addition of dual-antenna data allows the determination of this reference plane, or object trend component. It is then easy to perform the phase normalization process as given in (6), forcing each conjugate-product to have the correct phase trend $$\beta_{m,n} = \beta_{0,1} \frac{B_{m,n}}{B_{0,1}} \quad (8)$$

consistent with its baseline separation. Conventional approaches can be used to fit $\beta_{m,n}$ to the data. For efficiency, the phase derivative regression bias term computed above is utilized. It indicates the difference between the linear phase of inter-pass interferograms and that of dual-channel interferograms. In addition, it may be useful to iterate the estimation of $\beta_{m,n}$ and $B_{m,n}$, described above, because each is affected by errors in the other.

Figure 4:
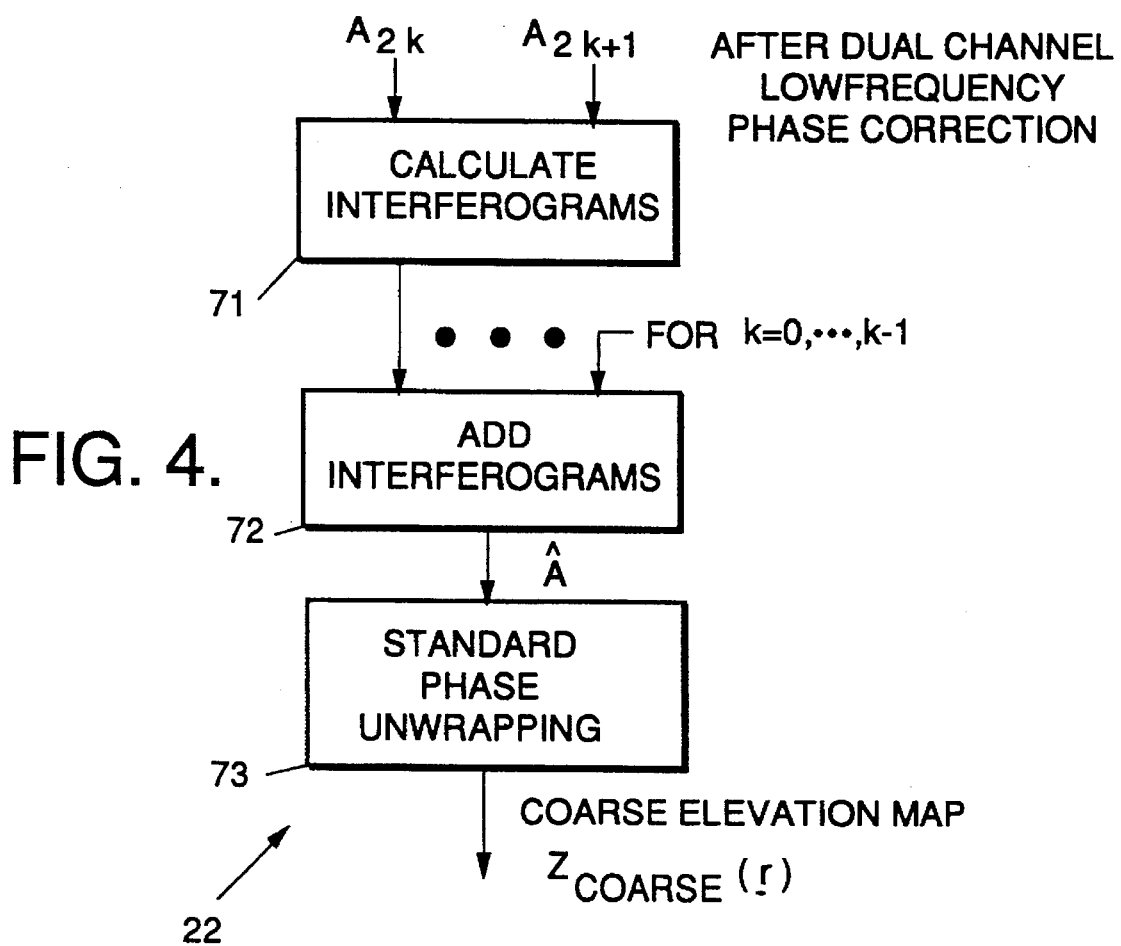
FIG. 4 details the coarse elevation processing step of the method of FIG. 2.

FIG. 4 details the coarse elevation processing step 22 of the method 20 of FIG. 2. The coarse elevation processing step 22 produces elevation maps from the dual antenna image-pairs, $A_{2k}, A_{2k+1}$. In the case of multiple passes, the coarse elevation processing step 22 averages the dual-antenna results $A_{2k}A_{2k+1}$ to enhance the accuracy of the coarse-precision map, which is used later for combining and calibrating the interpass image-pairs. The interferograms are calculated in step 71 after dual channel low-frequency phase corrections have been made to the complex image pairs $A_{2k}, A_{2k+1}$. Normalized interferograms are then added in step 72, and the summation in (5) is repeated after phase normalization per equation (6) so that, except for random noise, the product images add in phase and produce $\hat{A}$. The phase of $\hat{A}$ is then unwrapped in step 73 and the elevation is then computed. This produces the coarse elevation map $z_{coarse}(r)$. Only the principal phase is measurable from a single sample. The resulting ambiguity is very minor for the dual-antenna products. A two dimensional least-squares phase unwrapping approach is employed to resolve these ambiguities. The unwrapped phase, denoted by $\hat{\phi}_{0,1}$ is proportional to z.

Figure 5:
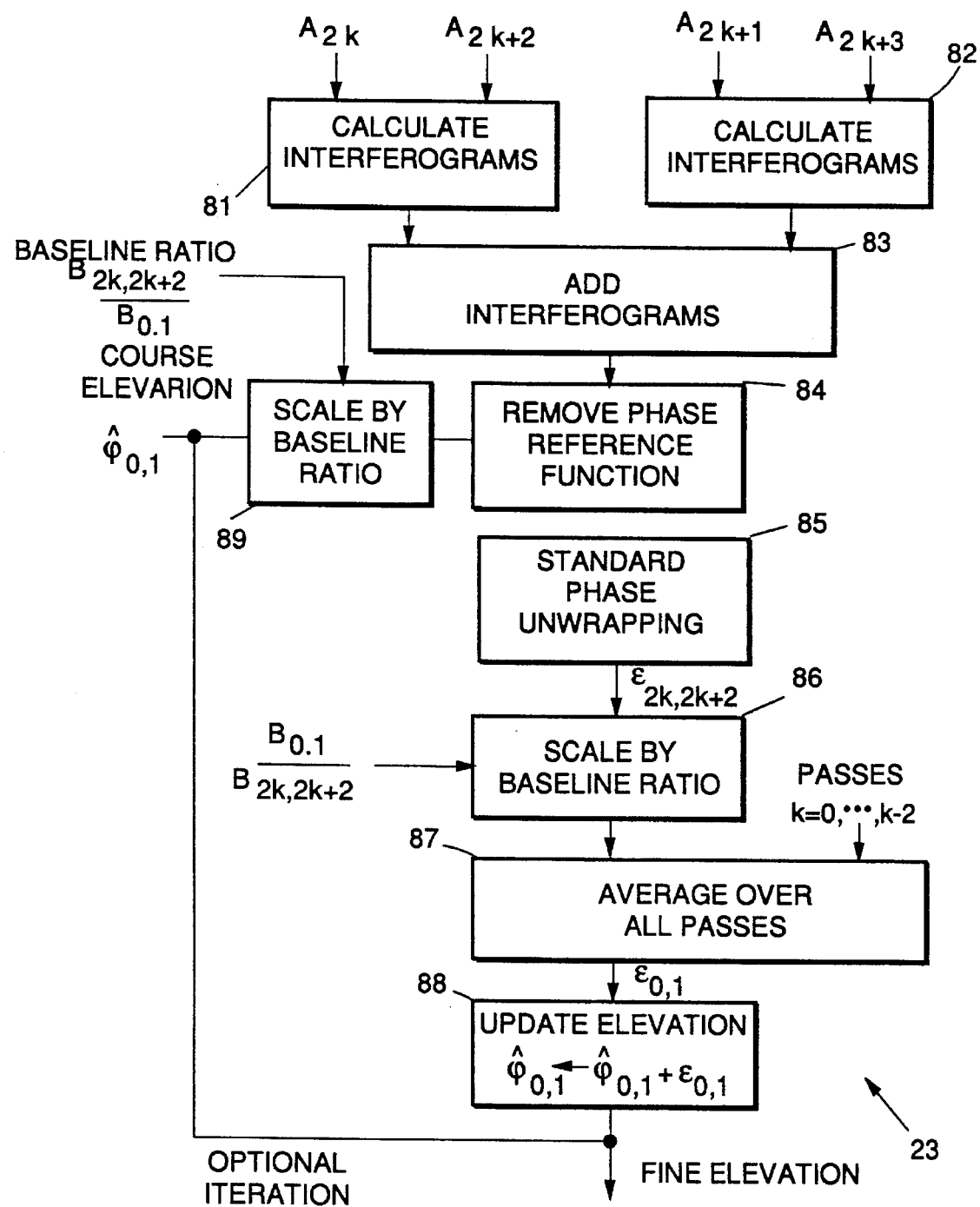
FIG. 5 detail the fine elevation processing step of the method of FIG. 2.

With reference to FIG. 5, the fine elevation processing step 23 that produces fine elevation estimates and will now be discussed in more detail. The coarse elevation estimate is used to initialize the fine elevation estimation processing step 23. The maximum-likelihood (ML) estimate includes all images jointly, selecting the z that maximizes the conditional distribution $p(A_0, \ldots A_{2K-1}/z)$. The fine elevation processing step 23 comprises calculation of the residual phase. One way to select the image pairings (values for (m, n)) is indicated in FIG. 5 where the following $2(K-1)$ interferograms are calculated. The interferogram $A_{2k}A_{2k+2}$ is added to $A_{2k+1}A_{2k+3}$ for $K=0, \ldots, K-2$. Each such interferogram pair should be identical except for noise, so they are added to reduce noise. Then the next step is to predict the phase of each interferogram sum $A_m A_n^*$ given the baseline ratio and the phase $\hat{\phi}_{0,1}$ of the dual antenna pairs, yielding $$\phi_{m,n} = \phi_{0,1} \frac{B_{m,n}}{B_{0,1}} \quad (9)$$

More particularly, interferograms are calculated for complex images pairs $A_{2k}, A_{2k+2}$ and $A_{2k+1}, A_{2k+3}$ in steps 81, 82. The interferograms are then added in step 83. The phase reference function is removed in step 84 using the coarse elevation map that is scaled by the baseline ratio in step 89. This produces an interferogram having residual phase. Phase unwrapping of the interferogram is then performed in step 85. The phase unwrapped interferogram is then scaled by the baseline ratio in step 86. The scaled interferogram is then averaged over all passes in step 87. The elevation is then updated in step 88 to produce a fine elevation map.

As the average residual elevations are computed (step 87), they are accumulated to form an average residual $\hat{\phi}_{0,1}$. This may be a weighted-sum based on an estimated phase variance (computed based on interferogram magnitude).

The initial phase estimate (elevation map) is updated by $$\hat{\phi}_{0,1} \leftarrow \hat{\phi}_{0,1} + \epsilon_{0,1} \quad (10)$$

This may also be a weighted summation.

The fine elevation processing step 23 may be repeated (shown by the optional iteration loop between the output of the update elevation step 88 and the scale by baseline ratio step 89) to reduce the effects of errors that impact the results nonlinearly. For example, ambiguities in $(\hat{\phi}_{m,n}$ not resolved correctly on the first pass can sometimes be corrected after obtaining the updated phase estimate $\hat{\phi}_{0,1}$ of equation (10). It can also be performed recursively, instead of in a batch mode as described above.

Selection of the baseline separation will now be discussed. The selection of multiple baselines influences map elevation accuracy. One strategy is to increase the baseline separation for each pass so that the amount of elevation slope that can be sensed unambiguously increases with each pass. This leads to baseline ratio between passes of $$\frac{B_{m,n+2}}{B_{m,n}} \approx \frac{c_0 \sigma_\phi}{2\pi} \quad (11)$$

where $\sigma_{1\phi}$ is the design phase noise and $c_0$ is a design constant. With this type of baseline separation, each pass of the sensor bootstraps the ambiguity resolution process for the next pass. The separation of the two antennas should be large enough to produce a useful map product on a single pass.

Referring to FIGS. 6a–6d, they respectively show the marginal likelihood function $p(A_m, A_n/z)$ for three interferograms and an ML estimate obtained from the product of marginal likelihoods to illustrate the fine elevation process 23. This maximum-likelihood formulation leads to an equivalent least-squares approach described below. It selects the z that minimizes a norm of the residual phase between a model image and the actual images. An approximate solution is described below.

FIGS. 6a–6d show marginal likelihood functions and an ML phase estimate in a single pixel, based on the product of marginal likelihoods. Note that $$z \approx \frac{\phi_{m,n}}{B_{m,n}}.$$

Figure 6A:
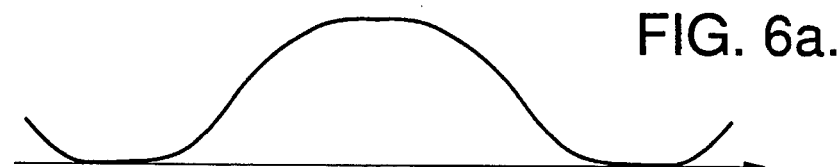
FIGS. 6a–6d show maximum-likelihood elevation estimation employed in the processing method of FIG. 2.
Figure 6B:
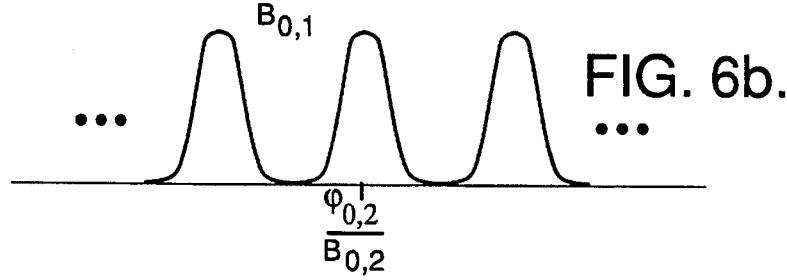
Figure 6C:
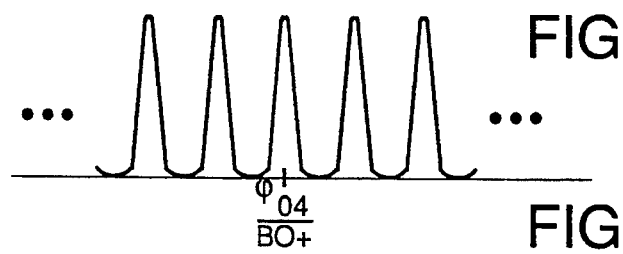
Figure 6D:
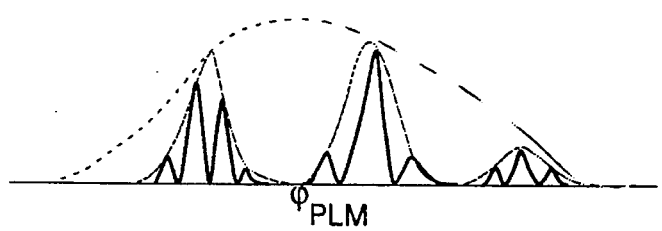

FIG. 6a shows the dual antenna likelihood function $p_{01}(z) = p(A_0 A_1/z)$. Then $A_m A_n^*$ is normalized to remove $\hat{\phi}_{m,n}$, wherein $p_{02}(z) = p(A_0 A_2/z)$, shown in FIG. 6b. Then the phase of the normalized version of $A_m A_n^*$ is unwrapped to obtain the residual phase $\epsilon_{m,n}$ wherein $p_{04}(z) = p(A_0 A_4/z)$, shown in FIG. 6c. Then $\epsilon_{m,n}$ is scaled back into the dual-antenna baseline so that it can be averaged with the residuals from other inter-pass pairs, shown in FIG. 6d, to produce a joint likelihood $p(A_0, \ldots A_{2K-1}/z)$.

The volume imaging step 24 will now be discussed. Previously, each range/azimuth cell was assumed to have a contribution from a point on a single-valued surface, which could be reconstructed by estimating surface elevation. Surface elevation estimation was reduced to a frequency estimation problem which was solved by estimating phase differences. Layover effects from severe terrain, vehicles concealed under trees, and manmade structures can produce radar returns with contributions from more than one elevation in a particular range/azimuth cell. This poses a more general problem of estimating the frequency of a superposition of several sinusoids, i.e. spectral estimation. The elevation aperture may not be sufficiently large for conventional imaging. The nonuniform sampling of the elevation data ($B_{m,n}$ is not constant) is an added complication.

FIG. 7 details the volume imaging processing step 24 of the method 20 of FIG. 2. For each of the complex images $A_0$, ... $A_{2k+2}$, a pixel (I) is selected for volume processing based on magnitude, as indicated in step 91. Scatter signatures are then computed and subtracted from each image in step 92, using stored elevation and complex amplitudes 96. Additional scatterers are then detected in step 93. If all scatters are detected in decision block 94, the complex amplitude and elevation are estimated for the scatter in step 95 and are stored (step 96). The procedure is repeated for each pixel by way of the feedback loop 97 which causes the procedure to detect the scatters for each pixel.

More particularly, FIG. 7 shows an iterative procedure for performing the volume imaging step 24 of FIG. 2. The volume imaging step 24 is achieved by estimating a single dominant frequency component (step 95), cancelling it (steps 92, 96), and then repeating the process. The details of the volume imaging step 24 are as follows. First, pixels are selected for volume imaging according to a signal-to-noise ratio (SNR) or magnitude test (step 91). Those with sufficient magnitude for volume imaging are processed further by the following iterative algorithm.

Each selected pixel is tested further to detect the presence of additional scatterers (step 93) at an elevation different than indicated by the fine elevation processing steps and any previous iteration of volume imaging. This is accomplished by retrieving the complex amplitude and elevation for any scatterers previously detected in that pixel (step 96). The signatures for each scatterer is subtracted from each complex image at that pixel (step 92). The resulting residual is tested. If the sum of the magnitude squared residuals exceeds a threshold then an additional scatterer is indicated. This is a type of goodness-of-fit test between the model, comprising all detected scatterers, and the observed complex image values.

If no additional scatterer is detected (step 94) then the process is terminated for that pixel and the next pixel is tested (loop 97). If an additional scatterer is indicated (step 94) then its complex amplitude and elevation are estimated (step 95) using the coarse and fine elevation estimation processing described above. The estimated amplitude and elevation are stored (step 96) and the iterative processing steps are repeated.

Thus there has been described new and improved hyper-precision SAR interferometry that uses a dual-antenna multi-pass SAR system and processing method. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An interferometric synthetic aperture radar system for producing a highly precise three dimensional SAR image, said system comprising:

a synthetic aperture radar system having two antennas separated by a predetermined separation distance which generates data comprising complex image pairs representative of an image scene; and processing means for processing the data comprising the complex image pairs, for calibrating the data comprising the complex image pairs to provide calibrated data, for processing the calibrated data to generate a low ambiguity SAR elevation map, for processing the low ambiguity SAR elevation map to provide an enhanced SAR elevation map, and for processing the enhanced SAR elevation map to produce a precise three dimensional SAR image, said processing means comprising:

(i) means for processing the data using low frequency phase error processing to remove low frequency phase inconsistencies between same-pass image pairs;

(ii) means for processing the data using inter-pass, low frequency processing to remove low frequency phase inconsistencies between inter-pass image pairs, and (iii) means for processing the data using inter-pass baseline processing to provide a coarse estimate of the elevation angel separation between each pass.

2. The system of claim 1 wherein the processing means comprises:

means for processing the calibrated data to add data from the dual-antenna interferometer to reduce the effects of noise; and means for spatially phase unwrapping the calibrated data to resolve minor ambiguities in the coarse elevation estimate.

3. The system of claim 1 wherein the processing means comprises:

means for providing inter-pass residual phase processing of the data to compute the phase update attributable to each pass of the interferometer;

means for providing average scaled residual processing of the data to combine these multiple phase updates with desired relative scaling into a single update; and means for processing the single update to update the elevation map provided by coarse elevation angle estimation.

4. The system of claim 3 wherein the processing means comprises:

means for iteratively processing the updated elevation map to provide an enhanced elevation map having greater accuracy.

5. The system of claim 1 wherein the processing means comprises:

means for predicting phase and magnitude of a dominant surface in the image scene to provide predicted data;

means for subtracting the predicted data from the image data to provide residual data; and means for estimating the elevation of the residual data.

6. A method of processing synthetic array radar data comprising complex image pairs generated by an interferometric synthetic aperture radar system to produce a precise three dimensional SAR image, said method comprising the steps of:

calibrating the data comprising the complex image pairs to provide calibrated data;

generating a low ambiguity SAR elevation map from the calibrated data, comprising the steps of:

(i) processing the calibrated data to add data from the dual-antenna interferometer to reduce the effects of noise, and (ii) spatially unwrapping the calibrated data to resolve minor ambiguities in the coarse elevation angel estimation step;

generating an enhanced SAR elevation map by processing the low ambiguity SAR elevation map; and generating a highly precise three dimensional SAR image by processing the enhanced SAR elevation map.

7. The method of claim 6 wherein the step of calibrating the data comprises the steps of:

processing the data using low frequency phase error processing to remove remove low frequency phase inconsistencies between same-pass image pairs;

processing the data using inter-pass, low frequency processing to remove low frequency phase inconsistencies between inter-pass image pairs; and processing the data using inter-pass baseline processing to provide a course estimate of the elevation angle separation between each pass.

8. A method of processing synthetic array radar data comprising complex image pairs generated by an interferometric synthetic aperture radar system to produce a precise three dimensional SAR image, said method comprising the steps of:

calibrating the data comprising the complex image pairs to provide calibrated data;

generating a low ambiguity SAR elevation map from the calibrated data;

generating an enhanced SAR elevation map by processing the low ambiguity SAR elevation map comprising the steps of:

(i) inter-pass residual phase processing to compute the phase update attributable to each pass of the interferometer, (ii) average scaled residual processing to combine these multiple phase updates with desired relative scaling into a single update, and (iii) processing the single update to update the elevation map provided by the coarse elevation step; and generating a highly precise three dimensional SAR image by processing the enhanced SAR elevation map.

9. The method of claim 8 wherein the step of generating an enhanced SAR elevation map further comprises the step of:

iteratively processing the updated elevation map to provide greater accuracy under adverse conditions and to provide an enhanced elevation map.

10. A method of processing synthetic array radar data comprising complex image pairs generated by an interferometric synthetic aperture radar system to produce a precise three dimensional SAR image, said method comprising the steps of:

calibrating the data comprising the complex image pairs to provide calibrated data;

generating a low ambiguity SAR elevation map from the calibrated data;

generating an enhanced SAR elevation map by processing the low ambiguity SAR elevation map; and generating a highly precise three dimensional SAR image by processing the enhanced SAR elevation map, comprising the steps of:

(i) predicting the phase and magnitude of a dominant surface in the image scene to provide predicted data, (ii) subtracting the predicted data from the image data, (iii) estimating the elevation of residual data, and (iv) repeating the above three steps for each pass.

* * * * *